Figure 1:
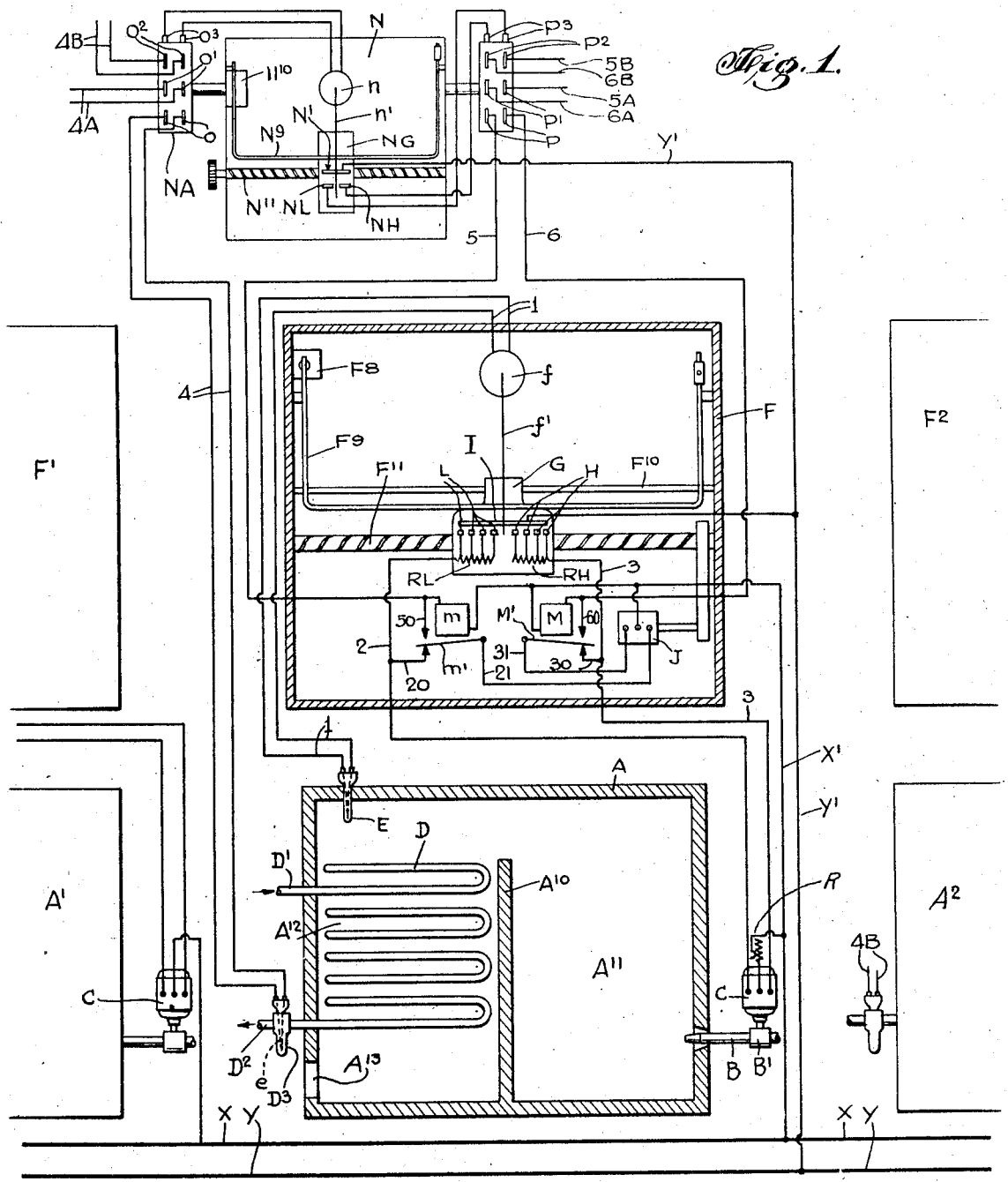

June 24, 1930.  T. R. HARRISON  1,765,977
METHOD OF AND APPARATUS FOR FURNACE CONTROL
Filed Dec. 12, 1927

INVENTOR
THOMAS R. HARRISON
BY
John E. Hubbell
ATTORNEY

Patented June 24, 1930

1,765,977

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

METHOD OF AND APPARATUS FOR FURNACE CONTROL

Application filed December 12, 1927. Serial No. 239,506.

The general object of the present invention is to provide an improved method of and apparatus for controlling the operation of a furnace. The invention was primarily devised and is especially adapted for use in controlling the operation of a tube still or oil heating furnace, and a specific object of the invention is to provide an improved oil heating furnace control characterized by the simple and effective manner in which a desirably constant oil delivery temperature is maintained and in which fluctuations in furnace temperature conditions are minimized.

In the preferred practical mode of practicing the present invention contemplated by me I employ in conjunction with each furnace controlled, a furnace controller which is responsive to the temperature of the furnace and which operates primarily to prevent material variation from a furnace temperature adequate to provide approximately the oil heating effect desired and which corrects departures of furnace temperature from this value with such rapidity that no appreciable fluctuation in the oil temperature is produced. The furnace controller is actuated by a temperature sensitive element such as a thermocouple which is located so as to be much more quickly responsive to fluctuations in furnace temperature than is the oil flowing through the tubes of the still, so that fluctuations in furnace temperature are detected and corrected without permitting any noticeable change in oil temperature.

To avoid furnace temperature fluctuations resulting from any time lag in the furnace temperature response to a change in the rate of combustion, and to avoid hunting resulting from over-adjustments effected by the furnace controller, and to produce a quick enough response to avoid oil temperature fluctuations, the furnace controller is made quick acting, and is adapted to adjust a fuel supply valve, or to otherwise make furnace adjustments on a departure of the furnace temperature from a previously stabilized value, effective to quickly stabilize the furnace temperature at a new value intermediate the previous stabilized value and the temperature initially attained on such departure, the amount of furnace adjustment so made being so great in relation to the extent of said departure that the newly established stabilized temperature is negligibly different from the former stabilized temperature. To this end also, the furnace controller is arranged to make both furnace adjustments and self adjustments when the furnace temperature changes, the furnace adjustment tending to arrest the temperature change and the self adjustment serving when the furnace controller, as in the preferred form hereinafter described, comprises a control table and a furnace temperature indicator, to cause the neutral point of the control table to seek a position coinciding with whatever position the pointer of the furnace temperature indicator may take.

When the furnace temperature departs from a stabilized value a large over-correction is made in the rate of fuel feed as the control table positions itself in accordance with the changed reading of the meter, this over-correction, which causes prompt return of the temperature to approximately the previous stabilized condition, such that as the control table returns with the indicator pointer to this new position, the rate of fuel feed is returned to a value usually somewhat different from its original value which is then the correct rate of fuel feed to maintain the new stabilized temperature.

During the process of re-establishing a stabilized condition of temperature it is permissible, and even desirable that the temperature of the furnace shall fluctuate several times above and below the desired stabilized temperature, these fluctuations being quick enough to avoid their being registered in the oil temperature.

It is permissible and conducive to close and even control of the oil temperature to permit the furnace to fluctuate continuously with an amplitude of a very few degrees about an average value sufficient to maintain the desired oil temperature.

To correct for variations in the temperature to which the oil is heated or other furnace heating effect, which result from the differences between the different stabilized or average furnace temperatures which the furnace controller tends to maintain, or from other causes, I employ a second controller responsive to the oil temperature or other heating effect, for periodically exerting compensating effects modifying one or the other, but not both of the two adjustments produced by the furnace controller.

In the preferred form of apparatus devised for carrying out the invention, the furnace controller employed comprises a galvanometer responsive to furnace temperature, a control table, and mechanism actuated by the displacement of the galvanometer pointer from a neutral position relative to the control table to adjust a fuel supply regulating valve or analogous furnace adjusting device, and to adjust the table, each in a direction tending to minimize the displacements of the galvanometer pointer relative to the control table. The co-operating second controller includes a galvanometer responsive to the temperature to which the oil is heated or to some other furnace heating effect, and is arranged to make corrective adjustments either of the furnace adjusting device or of the table adjusting means, as required to modify the stabilized or average temperature of the furnace to maintain the desired oil temperature.

By making the furnace controller quick acting and of a non-hunting type, I reduce to a negligible minimum fluctuations in furnace operating conditions tending to produce inefficient combustion and tending to give rise to local and temporary overheating effects especially objectionable in the case of an oil still, and also correct such fluctuations in furnace temperatures so quickly that there can be no resultant oil temperature variation comparable in magnitude to the variation which would occur if the requisite furnace adjustments were less quickly made. The use of the second controller, responsive to oil temperature, eliminates the small semi-permanent variations in oil temperature which would otherwise result from the fact that the furnace controller is itself of a stable or non-hunting type, and for that very reason does not tend to maintain an unvarying furnace temperature condition.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of the invention.

Figure 2:
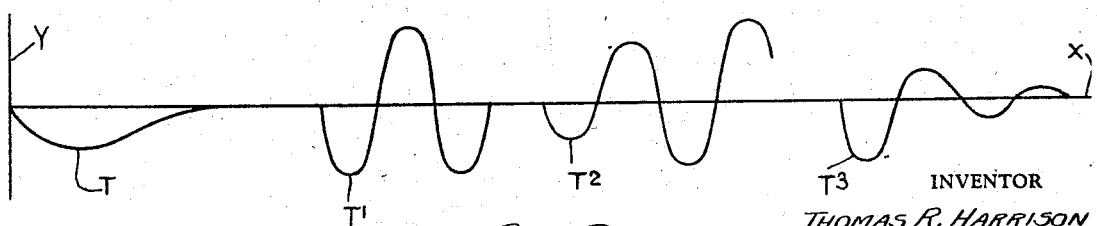

Of the drawings:

Fig. 1 is a diagrammatic representation of a control system for a battery of the still furnaces; and Fig. 2 is a diagram illustrating various ways in which the controlled temperature may respond to control adjustments.

In the arrangement diagrammatically illustrated in Fig. 1, A, $A^1$ and $A^2$ represent tube oil stills or oil heating furnaces which may be of identical construction. As shown, there is associated with each of the stills A, $A^1$ and $A^2$, a corresponding individual furnace controller or instruments F, $F^1$ and $F^2$, respectively. These furnace control instruments may all be identical in construction and operation. The particular type of oil heating furnace A shown, by way of example, comprises a combustion chamber $A^{11}$ and a heating chamber $A^{12}$ in communication at their upper ends, over the top of a bridge wall $A^{10}$ separating the body portions of said chambers. Oil or other fluid fuel is supplied to the combustion chamber $A^{11}$ by a burner or burners B at a rate depending upon the adjustment of a fuel supply valve $B^1$, and the latter being adjusted, as hereinafter described, by means of a reversible electric motor C. $A^{13}$ represents the stack outlet from the chamber $A^{12}$. The oil to be heated passes through tubes D located in the heating chamber $A^{12}$, from an oil inlet $D^1$ to an oil outlet $D^2$.

Associated with the furnace A are means responsive to the furnace temperature, and means responsive to the oil temperature. As shown, the means responsive to furnace temperature comprises a thermo-couple E located in the upper portion of the heating chamber $A^{12}$ so as to respond to the heating effect or capacity of the furnace without being exposed to the maximum temperature in the combustion chamber. The means responsive to the temperature to which the oil is heated, in Fig. 1, comprises a thermo-couple $e$ inserted in a pyrometer well $D^3$ located in the oil outlet connection $D^2$.

The furnace controller F comprises a galvanometer $f$ connected by conductors 1 to the terminals of the thermo-couple E. As shown, the connections are direct, but those skilled in the art will understand that the connections may well include a Wheatstone bridge or potentiometer circuit such as is commonly employed in connecting a galvanometer to a thermo-couple. The deflections of the pointer $f'$ are employed to effect compensating adjustments of the fuel regulating motor C. In the arrangement diagrammatically illustrated, the means for effecting such compensations include a mechanism $F^8$ periodically actuating a depressor $F^9$ in a known manner to thereby bring the pointer $f'$ of the galvanometer $f$ into engagement with co-operating control instrumentalities mounted on a control table G forming a part of the instrument F.

To make the controlling effect produced on the actuating of depressor $F^9$ proportional to the then deflection of the pointer $f'$ from a central or neutral position relative to the control table G, any one of various known or suitable arrangements for obtaining such a graduated control may be employed. For example, I may employ such an arrangement as is shown in my prior application, Serial No. 68,927, filed November 13, 1925. As shown by way of example in Fig. 1, however, the means for securing graduated control comprise a series of contacts H located at the high side of, and at different distances from the neutral point of the control table, and another series of contacts L, located at the low side of, and at different distances from the neutral point of the table. It is to be noted, however, that a single contact L and a single contact H would be sufficient to produce the desired graduated control, since the distance that the control table travels in bringing its neutral point to the pointer is a measure of the amount of adjustment made by motor C. With the arrangement illustrated, when the galvanometer pointer F' is at the high side of its neutral position, when depressed, it connects one or another of the contacts H, depending on the extent of its displacement from the neutral position to the contact I. Similarly, when the galvanometer pointer $f'$ is at the low side of the neutral position when depressed, it will connect one or another of the contacts L with contact I. The different contacts H are connected to a resistance RH at different points so that more or less of the resistance RH is connected in series between the contact I and a conductor 3 when the pointer connects the contact I to a contact H, depending on whether the particular contact H engaged is less or more remote from the neutral point of the table G. Similarly, the contacts L are connected to different points in a resistance RL so that more or less of the latter is connected in series between a conductor 2 and the contact I, when the pointer $f'$ engages a contact L which is less or more remote from the neutral position.

In the arrangement diagrammatically illustrated in Fig. 1, the fuel valve adjusting motor C is operated to decrease the fuel supply to the furnace when the pointer $f'$ connects the contact I to a contact H, and to an extent varying inversely with the amount of resistance RH then in circuit between the conductor 3 and contact I; and when the pointer $f'$ connects contact I to a contact L, the motor C is operated to increase the fuel supply of the furnace to an extent varying inversely with the amount of the resistance RH then in circuit between the conductor 2 and the contact I. The circuits by which the described control is effected include main or supply conductors X and Y, a branch $Y^1$ connecting contact I to the main conductor Y, a branch conductor $X^1$ connecting main conductor X to a common terminal of the motor C, and the conductors 2 and 3 which are connected to other terminals of the motor C. The three terminals of the motor C are connected to the windings thereof so that the motor is energized from the conductors X and Y to run in the direction to give the valve B' an opening adjustment when the conductor 2 is connected through a contact L and the contact I to the conductor Y, and so that the motor C runs in the opposite direction when the conductor 3 is connected through a contact H and contact I to the conductor Y. In the arrangement shown in Fig. 1, so far as it has been described, the instrument F would tend to increase and decrease the supply of fuel to the furnace A as the temperature in the furnace fell below or rose above a predetermined value, but with such a control there is a tendency to hunting or fluctuation of the furnace temperature which it is the object of the invention to prevent.

The means shown for preventing objectionable furnace temperature hunting includes means for adjusting the table G when the pointer $f'$ is displaced from the neutral position of the table so as to diminish the extent of such displacement. This adjustment of the control table G is effected by moving the table along guides $F^{10}$ and $F^{11}$ which extend transversely to the general direction of the pointer $f'$. The guide $F^{11}$ is a shaft formed with a thread or helical groove co-operating with a nut or nut-like part formed in, or carried by the table G, so that the latter is moved in one direction or the other when the shaft $F^{11}$ is rotated in one direction or the other. The shaft $F^{11}$ is thus rotated by a reversible motor J forming a part of the instrument F, and having its shaft connected to the shaft $F^{11}$ by suitable gearing.

Except at intervals, as hereinafter described, the motor J is energized whenever the motor C is energized, and in such manner that the neutral point of table G is moved toward the high or low side of the instrument F, accordingly as the energization of the motor J has been effected by the engagement of the pointer $f'$ with a contact H, or a contact L. The circuit arrangement by which the motor J is thus energized comprises a branch conductor X' connecting the common terminal of the motor J to the main conductor X, a conductor 20, armature $m'$ and conductor 21 connecting a second terminal of the motor J to the conductor 2; and a conductor 30, armature M' and conductor 31 connecting the third terminal of the motor J to the conductor 3.

In the operation of the control apparatus, so far as it has been described, the motors C and J tend to adjust valve B' and table G, respectively, and each position of the table G corresponds to a particular adjustment of the valve B'. With the control instrument F properly proportioned and calibrated to effect rapid furnace adjustments without hunting, gradual variations in the exit oil temperature may occur unless suitable corrective adjustments are made. The means illustrated for effecting such corrective adjustments, comprise a control instrument N re-responsive to variations in the temperature to which the oil is heated, and operating in response to such variations to vary the relation between the position of the control table G and the position or setting of the fuel control valve B' at intervals as required, to minimize and practically eliminate significant variations in the temperature to which the oil is heated. In the particular arrangement shown, the instrument N accomplishes its effects through its action on circuits controlling the operation of the motor J.

The instrument N includes a galvanometer $n$ connected to the thermocouple $e$ in a manner which may be exactly like that in which the galvanometer $f$ is connected to the thermocouple E. A single control instrument N may advantageously be employed to effect corrective adjustments for each of a plurality of furances as A, $A^1$ and $A^2$. In such case, the instrument N is advantageously provided with a switch NA periodically adjusted, as by means of a clock motor or timing mechanism, forming a part of the instrument N, to successively connect the terminals of the galvanometer $n$ to the thermocouple $e$ of the furnace A, and to corresponding thermocouples of the furnace $A^1$ and $A^2$ at regular intervals. As diagrammatically shown the switch NA comprises a rotating body provided with a pair of side by side contacts O connected by conductors 4 to the thermocouple $e$ of the furnace A, a pair of side by side contacts O' connected to conductors $4^A$ running to the terminals of the oil temperature thermocouple (not shown) of the furnace A', and a pair of side by side contacts $O^2$ connected to conductors $4^B$ running to the terminals of the oil temperature thermocouple of the furnace $A^2$. By the rotation of the switch body the contacts O, O' and $O^2$ are successively moved into engagement with stationary brushes $O^3$ which are connected to the windings of the galvanometer $n$.

The control instrument N comprises means including a pointer depressor $N^9$ and actuator $N^{10}$, which may be like those provided in the instrument F for causing the deflections of the pointer $n'$ of the galvonometer $n$ to electrically connect a contact NI to one or the other of contacts NH and NL located at high and low sides, respectively, of the neutral positions of a control table NG. The latter is not automatically adjusted, as is the table G of the instrument F, but may be manually adjusted to thereby vary the oil temperature which the instrument N tends to maintain, as by means of a manually rotatable screw shaft $N^{11}$.

The contact NI is connected by a branch conductor Y' to the main conductor Y. The contacts NL and NH are connected to the stationary brushes $P^3$ of a switch mechanism NB, and thereby serve, at periodical intervals, to energize the motor J of instrument F for operation in one direction or the other, and at other periodic intervals to similarly energize the corresponding table adjusting motors of the control instruments $F^1$ and $F^2$. As shown, the switch NB is identical in construction and operation with the switch NA, comprising pairs of side by side contacts P, $P^1$ and $P^2$, successively brought into engagement with the stationary brush contacts $P^3$. The contacts P engage the brushes $P^3$ when the contacts O engage the brushes $O^3$; the contacts P' engage the brushes $P^3$ when the contacts O' engage the brushes $O^3$; and the contacts $P^2$ engage the brushes $P^3$ when the contacts $O^2$ engage the brushes $O^3$.

When the contacts P are in engagement with the brushes $P^3$, the low contact NL is connected through one of the contacts $P^3$ and one of the contacts P to a conductor 6, and the high contact NH is similarly connected to a conductor 5. If at this time either of the contacts NL or NH is connected by the galvanometer pointer $n'$ to the contact NI, and thereby to the supply conductor Y, the resultant energization of the conductor 5 or 6 momentarily interrupts the normal control of the motor J of the instrument F by the galvanometer $f$, and energizes the motor J for operation in a direction dependent on the position of the pointer $n'$ of the galvanometer N. When the conductor 6 is thus energized as a result of the oil temperature falling below the predetermined value, the motor J is operated to adjust the control table G to the high side, thereby increasing the furnace temperature which the controller F tends to maintain. Conversely, when the conductor 5 is energized, the motor J is energized to adjust the table G to the low side, and thus diminish the furnace temperature, which the controller tends to maintain.

In the particular arrangement shown in Fig. 1 the energization of the conductors 5 and 6 produces corresponding energizations of the motor J through means comprising electro magnets $m$ and M. The electro-magnet $m$ has one terminal connected to the conductor 5, and the electro-magnet M has one terminal connected to the conductor 6. The other terminals of the magnets $m$ and M are connected through a branch conductor X' to the supply conductor X. The energization of the electro-magnet $m$ raises the armature $m'$, and thereby disconnects the conductor 20 from the conductor 21, and connects the latter to a branch 50 of conductor 5, and thus causes the motor J to run in the direction to adjust the table G to the low side. Similarly, the energization of the magnet M raises the armature M' and thereby disconnects the conductor 30 from the conductor 31, and connects the latter to a branch 60 of the conductor 6, so that the motor J will then run in the direction to adjust the table G to the high side of the instrument F. Conductors $5^A$ and $6^A$ are provided to connect the contacts P' to the control instrument F', and conductors $5^B$ and $6^B$ are provided to connect the contacts $P^2$ to the control instrument $F^2$.

In general, the effect on furnace temperature of a control instrument, such as the instrument F which increases and decreases the supply of fuel to the furnace in response to decreases and increases in furnace temperature, must be of the character illustrated by one or another of the curves T, $T^1$, $T^2$ and $T^3$ shown in Fig. 2, wherein distances measured along the line X represent time intervals, and distances measured along the line Y in either direction, up or down, from its point of intersection with the line X, represent temperature increases or temperature decreases from an assumed normal temperature. If, as a result of a furnace temperature variation furnace adjustments are made of the right magnitude to slowly return the furnace temperature to the proper value, the furnace temperature variation may be of the character indicated by the curve T. In general, such a method of control is too sluggish to be practicable, and a succession of adjustments must be made following a departure of the furnace temperature from a previously stabilized value whereby the temperature of the furnace is caused to make several oscillations of slight and decreasing amplitude above and below the desired value as indicated by the curve $T^3$ before the furnace temperature is again stabilized. Thus the average temperature of the furnace is held more closely to the desired stabilized value and the oscillations are too rapid to register in the oil temperature.

Unless such adjustments are properly proportioned, however, such a condition of hunting may develop, that the control temperature will constantly fluctuate, and such fluctuations may be undesirably large. If the apparatus is so proportioned and operated that after each variation in the controller temperature, the controller F first returns the temperature to its previous value, and then produces a temperature variation in the opposite direction of similar magnitude, the furnace temperature will oscillate in an undamped manner as indicated by the curve T'. If the over-adjustment, following any variation from normal of the control temperature, is greater than that resulting in the production of the curve T', the temperature oscillations will be of increasing magnitude as indicated by the curve $T^2$. If the over-adjustment is less than that giving rise to the curve T', the furnace temperature oscillations will be of decreasing magnitude as indicated by the curve $T^3$ in Fig. 2.

With a control giving the results indicated by the curve $T^2$, objectionable hunting is inevitable. With the operation indicated by the curve T and $T^3$, objectionable hunting is eliminated. Continuous hunting of furnace temperature as indicated by curve T' is not objectionable if of small amplitude and short enough period not to cause fluctuations to register in the oil temperature. As already stated, the operation indicated by the curve T is ordinarily too sluggish to be effective, principally because the furnace temperature is abnormal for a long enough period for the oil temperature to drift in the same direction and because the total amount of heat developed between the times that the temperature departs from and returns to a stabilized value is abnormal. Regulation of the kind indicated by the curve $T^3$ is readily obtainable however, with the apparatus shown in Fig. 1. The attainment of the mode of operation indicated by the curve $T^3$ of Fig. 2, requires proper co-ordination of such factors as the relation between the movement given control table G by motor J and that given valve, B' by motor C at each energization given through contacts H or L and the time lag of the furnace temperature behind a change in the rate of fuel supply. The time lag cannot be regulated by the instrument F, but at each energization through contacts H or L the extent of actuation of the control table G may be made appropriately small to accurately follow small changes in position of pointer f', and it is readily practicable to vary the extent of movement given to the valve B' to produce appropriately large but not excessive adjustments of fuel supply. When the pyrometer pointer f' departs from a stabilized temperature reading successive contacts will be made through contacts L or H until the neutral point of control table G is shifted to coincide with the poiner, and at the same time motor C is being operated for an equal total of running time and thus makes adjustment of valve B' in proportion to the extent of departure of the furnace temperature from the previously stabilized value.

The actuation of both motors ceases whenever the neutral point of control table G coincides with the pointer f' and hence depressor $F^9$ should be actuated as frequently as is possible only allowing time between actuations for pointer f' to swing to its position of equilibrium. The minimum extent of movement given table G when actuated through contacts L or H should be small enough to cause the table G to follow, but not over-step the minimum pointer motion which is chosen to produce corrective actions. When the temperature of the furnace is subject to changes more rapid than can be followed by the table G when taking a succession of these minimum steps at the frequency of the depressor actuations, extra contacts may be added, connected by resistors as shown to produce larger steps of valve and table motion at each energization of motor C and J when the pointer gets further away from the neutral position of table G.

In general with the stable control operation illustrated by curve $T^3$, a departure in furnace temperature from a previously stabilized value will result in adjustments again stabilizing furnace temperature at a value between the previously stabilized value and the temperature attained on said departure. For example, if the furnace temperature rapidly falls from any cause to a value 4° below the previous stabilized value, the temperature might well become stable again at a value 1° below said previous value. This difference between old and new values of stabilized temperature is successively less when the adjustments are altered to produce conditions represented by curves T, $T^3$, $T^1$, $T^2$, respectively, which may be established by arranging for motor C to make greater and greater adjustments of valve B′ with respect to the extent of the simultaneous movements of control table G as may be attained by making successive manual reductions of adjustable resistor R in series with the connection between motor C and the conductor X′. This is an inherent characteristic of the stability of operation of a control system operating in the manner indicated by the curve $T^3$. With otherwise uniform conditions of operation, the stabilization of the furnace temperature at different values tends, of course to slightly different exit oil temperatures. Such variations of exit oil temperatures are compensated for with the apparatus shown in Fig. 1 by the instrument N.

In view of what has been said, it will be readily understood that it is ordinarily advantageous to have the instrument N exert its compensating effect on each of the instruments F, $F^1$ and $F^2$ at intervals less frequent than those at which each of the instruments F, $F^1$ and $F^2$ may exert its regular controlling effects.

A reasonable increase in the length of the period between successive actuations of the instrument N on each individual furnace, reduces any hunting tendency due to the operation of that instrument. The fact that the period between successive operations of the controller N on any one furnace need not be particularly short, facilitates the use of a single controller N in connection with the battery of furnaces, each of which has an individual furnace controller like the controller F. Those skilled in the art will understand, of course, that each of the controllers N, F, $F^1$ and $F^2$, may have the usual provisions commonly included in pyrometric controllers for recording the temperature to which the corresponding galvanometer respond.

Characteristic advantages of the invention include its capacity for making large corrections in the rate of fuel supply when large corrections are required, and for varying the extent of correction made in accordance with the extent of departure of the furnace temperature from the correct value all without waiting for any resultant variation in the oil outlet temperature. The furnace temperature may thus be returned to normal value with a slight overshoot to prevent any significant variation of the oil temperature in response to the initial departure in furnace temperature, and the furnace temperature may be again stabilized while maintaining an approximately correct average temperature during the period of adjustment and restabilization. The controller N forms a means for finally correcting the furnace controller adjustment as required to eliminate, or reduce to an unobjectionable amount, any tendency for the oil outlet temperature to drift away from the desired value. Broadly novel subject matter disclosed in common in this application and in the earlier filed copending application of Richard P. Brown, Serial No. 198,298, filed June 11, 1927, and not generally claimed herein, is so claimed in said copending application.

While in accordance with the provisions of the statutes I have illustrated and described a preferred embodiment of the invention, it will be apparent to those skilled in the art that changes may be made in the form of apparatus and mode of procedure described in detail without departing from the spirit of the invention as set forth in the appended claims, and that some features of the invention may sometimes be used to advantage without a corresponding use of other features.

Having now described my invention, what I claim as new and desire to secure by Letters Patent, is:

1. The method of controlling a furnace which consists in correctively adjusting the rate at which heat is supplied to the furnace periodically to an extent depending on the difference between the furnace temperature at the time of each such adjustment and a previously established normal temperature, and in changing said normal temperature at the time of each such adjustment to diminish said difference by a definite amount, and in periodically adjusting the relation between the rate at which heat is supplied to the furnace and the then normal temperature to thereby correct for variations in a heating effect produced by the furnace.

2. The method of controlling a furnace which consists in correctively adjusting the rate at which heat is supplied to the furnace periodically to an extent depending on the difference between the furnace temperature at the time of each such adjustment and a previously established normal temperature value and in changing said normal temperature value at each such adjustment to diminish said difference by an amount depending upon the extent of said difference, and periodically, but at less frequent intervals than said rate is adjusted adjusting the relation between the rate at which heat is supplied to the furnace and the value of the then normal temperature to thereby correct for variations in a heating effect produced by the furnace.

3. The method of controlling a furnace which consists in maintaining a normal furnace temperature value, effecting a corrective adjustment in the rate of heat supply to the furnace on a departure of the actual furnace temperature from said normal value corresponding in amount to the extent of departure, varying said value at each such adjustment, and periodically adjusting the relation between the rate at which heat is supplied to the furnace and the current normal furnace temperature value to correct for variations in a heating effect produced by the furnace.

4. The method of controlling an oil heating furnace which consists in periodically adjusting the rate at which heat is supplied to the furnace by an amount at each adjustment dependent on the then difference between the actual furnace temperature and a previously established normal temperature value, altering said value at each such adjustment to diminish said difference by an amount dependent on the extent of such difference and periodically but at less frequent intervals than the first mentioned adjustments are made, adjusting the relation between the rate of heat supply and the existing normal temperature value to correct for variation in the temperature to which the oil is heated.

5. A furnace control system comprising in combination a periodically acting furnace controller responsive to furnace temperature and tending on a departure of the furnace temperature from a previously stabilized value to quickly stabilize the furnace temperature at a new value intermediate the first mentioned value and said new value, and a controller operating periodically, but at less frequent intervals than the first mentioned controller, in response to a furnace heating effect to produce a furnace temperature controlling effect tending to eliminate variations in said heating effect.

6. In a furnace control system, the combination with a control member of an element displaced relative to said control member by and in accordance with a variation in furnace temperature, means controlled by such displacement for correspondingly adjusting the rate at which heat is supplied to the furnace, means controlled by said displacement for correspondingly moving said member in the direction of said displacement, and means responsive to a furnace heating effect for actuating one of the previously mentioned means to vary the relation between the position of said member and the rate at which the heat is supplied to said furnace to thereby correct for variation in said effect.

7. In a furnace control system, the combination with a control member, of an element displaced relative to said control member by and in accordance with a variation in furnace temperature, means controlled by such displacement for correspondingly adjusting the rate at which heat is supplied to the furnace, means controlled by said displacement for moving said member in the direction of said displacement, and means responsive to a furnace heating effect for modifying the action of one of the previously mentioned means to correct for variations in said effect.

8. In a furnace control system, the combination with a control member, of an element displaced relative to said member by and in accordance with variation in furnace temperature, periodically operating means controlled by such displacement for correctively adjusting the rate at which fuel is fed to the furnace and for adjusting said member in the direction to diminish said displacement, the magnitude of each such adjustment corresponding to the magnitude of the then existing displacement, and means responsive to a furnace heating effect for periodically varying the relation between the rate of fuel feed and the position of said member to thereby correct for variation in said effect.

9. The combination with a plurality of furnaces each having a regulating device, of a separate furnace controller for each furnace responsive to the temperature thereof and regulating the corresponding device to minimize variations in said temperature, a second controller, means for making said second controller successively responsive to the heating effects produced by the different furnaces, and means actuated by said second controller for exerting a corrective regulating effect on each furnace in response to variations in the heating effect of that furnace.

10. The combination with a plurality of oil heating furnaces, a separate furnace controller for each furnace responsive to the temperature thereof and regulating the fuel supply thereto to minimize variations in said temperature, and a second controller, means for making said second controller successively responsive to the temperatures to which the oil is heated in the different furnaces, and means actuated by said second controller for correctively modifying the fuel supply regulating effect on each furnace of the corresponding furnace controller in response to variations in the temperature to which the oil is heated in the corresponding furnace.

11. In a furnace control system a furnace controller comprising an element adapted to deflect in response to variations in furnace temperature, a cooperating control member, a motor for adjusting said control member, a furnace regulating motor, and means for periodically actuating each of said motors in accordance with the then displacement of said element relative to said member, and means responsive to a furnace heating effect for periodically actuating one but not the other of said motors.

12. In a furnace control system a furnace controller comprising an element adapted to deflect in response to variations in furnace temperature, a cooperating control member, a motor for adjusting said control member, a furnace regulating motor, and means for periodically actuating each of said motors in accordance with the then displacement of said deflecting element relative to said member, and means responsive to a furnace heating effect for actuating one but not the other of said motors at intervals less frequent than those at which said motors are actuated by the first mentioned means.

13. The combination with a furnace and a regulating device therefor, of a control member, an element displaced relative to said control member by a variation in the temperature of the furnace, means controlled by such displacement for similarly adjusting said member and said device in accordance with the magnitude of said displacement, and means responsive to a furnace heating effect for varying the relation maintained by the first mentioned means between the position of said member and the adjustments of said device to correct for variations in said effect.

14. In continuously heating oil in a tube heater, the method which consists in varying the rate of heat supply to said heater at regular intervals in inverse response to temperature changes in the furnace at a point therein at which a change in the rate of heat supply produces a significant change in temperature more quickly than in the oil, and periodically, but at intervals less frequent than the first mentioned intervals, varying the heat supply in response to changes in the temperature to which the oil is heated.

15. The combination with an oil heater comprising tubing through which the oil is continuously passed and a furnace in which fuel is burned to heat the tubing, of fuel supply regulating means, a controller periodically actuated to adjust said means in inverse response to variations in a furnace temperature condition, and a second controller periodically actuated at intervals less frequent than those at which the first mentioned controller is actuated, for adjusting said means in response to variations in the temperature attained by the oil in passing through the tubing.

Signed at Philadelphia, in the county of Philadelphia and State of Pennsylvania, this ninth day of December, A. D. 1927.

THOMAS R. HARRISON.